(No Model.) 4 Sheets—Sheet 2.
H. B. MANKO & J. W. PAINE.
CASH REGISTER AND INDICATOR.
No. 450,416. Patented Apr. 14, 1891.
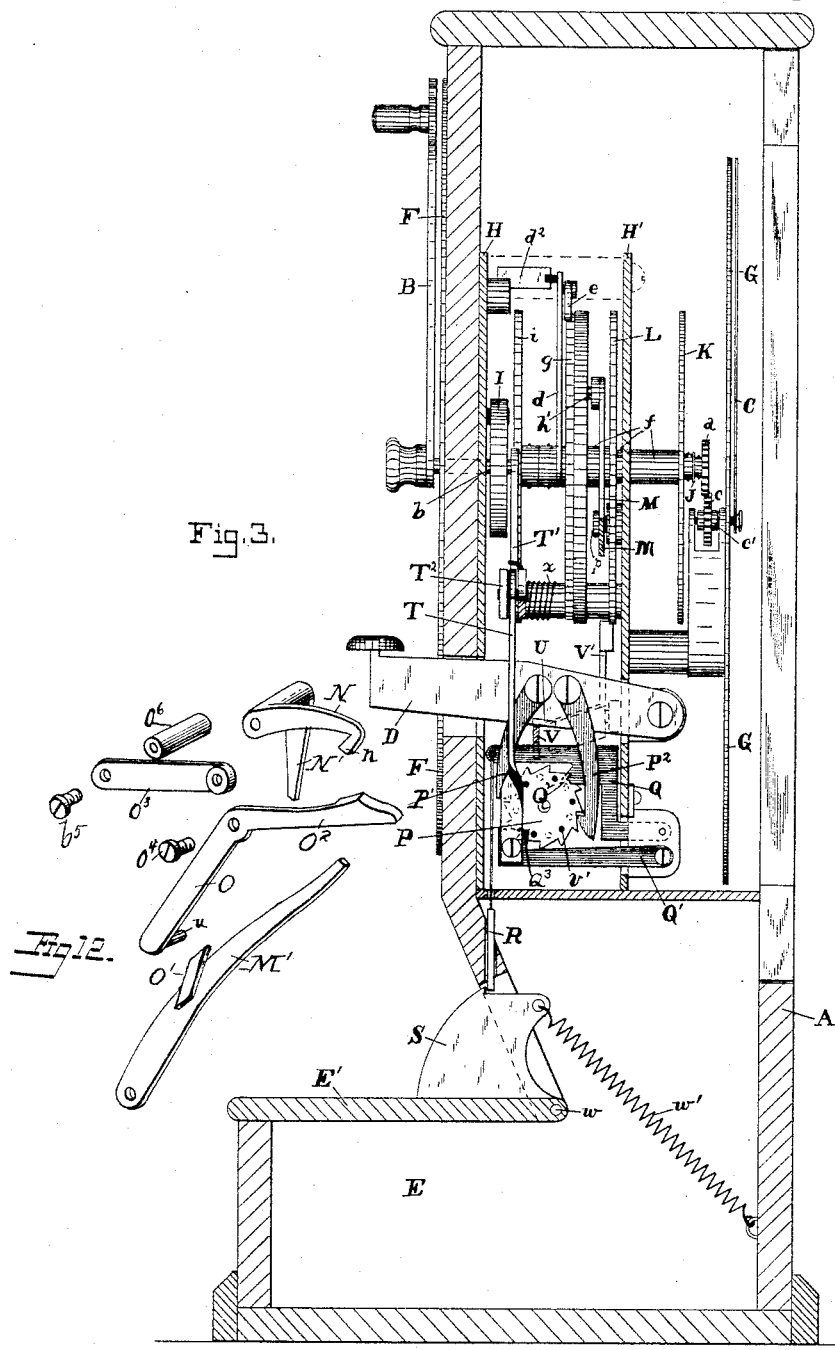
WITNESSES: Otto H. Ehlers. J. P. Davis.
INVENTORS: Henry B. Manko, John W. Paine,
BY Chas. B. Mann
ATTORNEY.

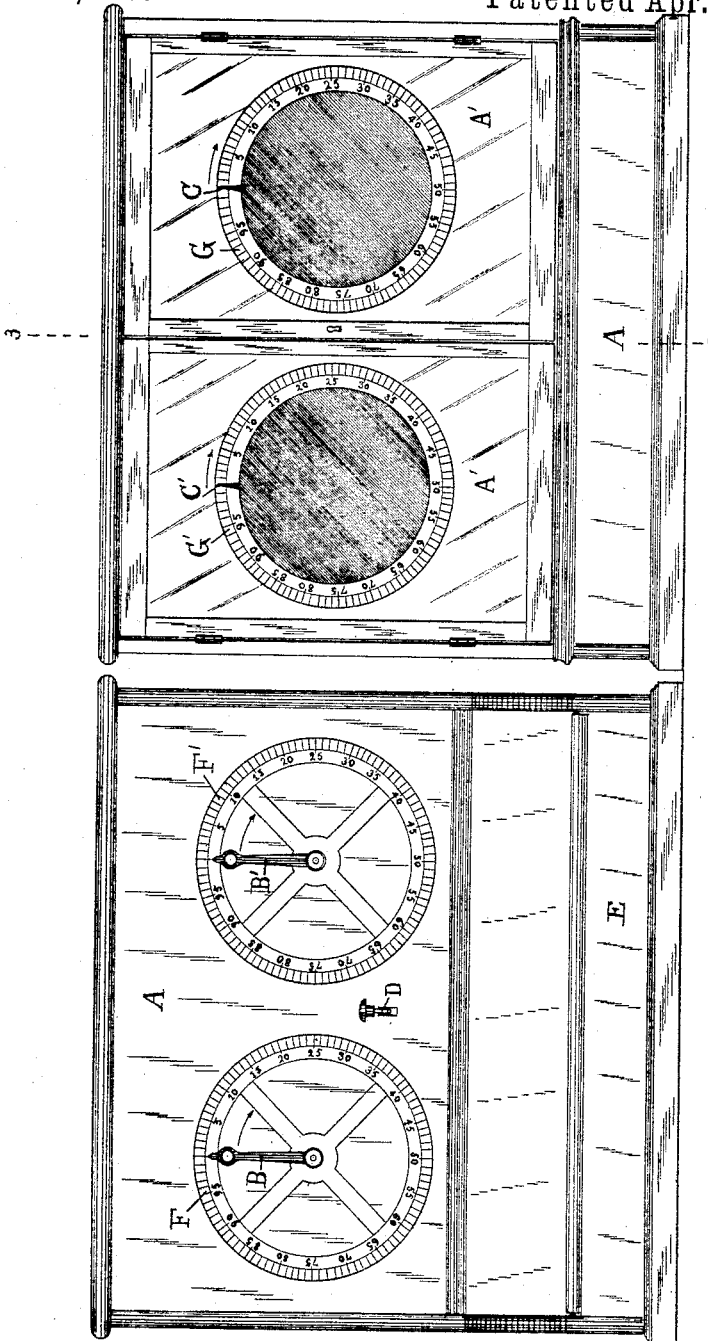

(No Model.) 4 Sheets—Sheet 3.
H. B. MANKO & J. W. PAINE.
CASH REGISTER AND INDICATOR.
No. 450,416. Patented Apr. 14, 1891.
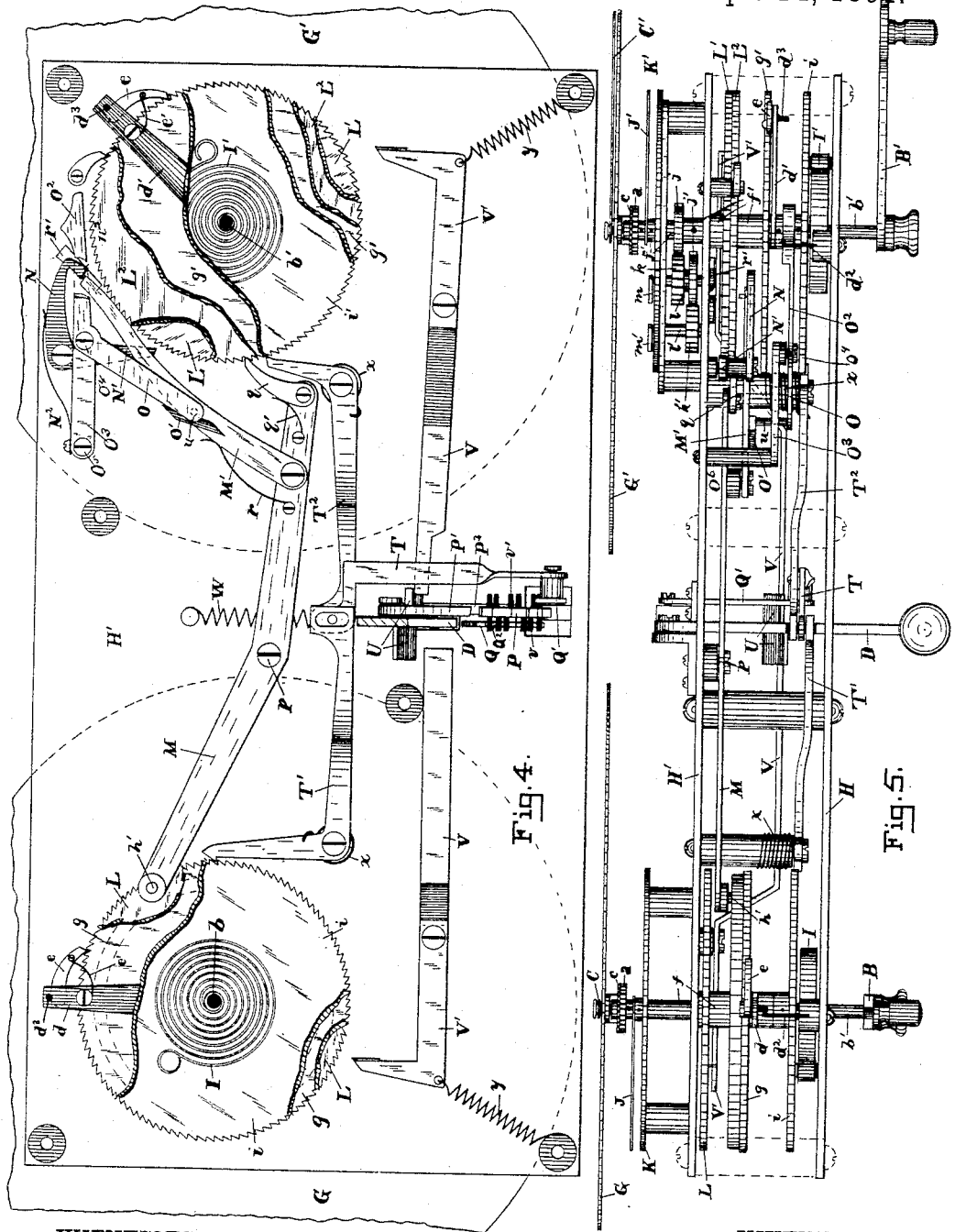
WITNESSES:
Otto H. Ehlers.
J. P. Davis.
INVENTORS:
Henry B. Manko,
John W. Paine,
BY Chas B. Mann
ATTORNEY.

(No Model.) 4 Sheets—Sheet 4.
H. B. MANKO & J. W. PAINE.
CASH REGISTER AND INDICATOR.
No. 450,416. Patented Apr. 14, 1891.
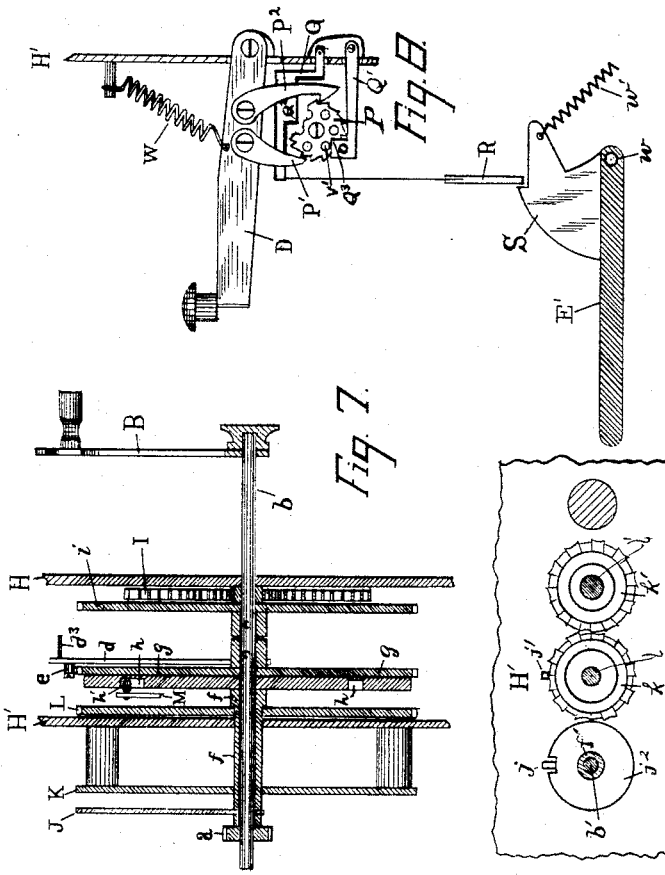
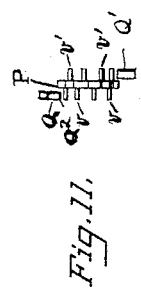
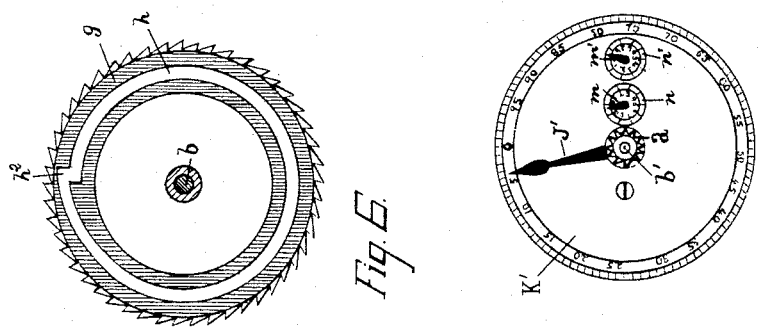
WITNESSES:
Otto H. Ehlers.
A. O. Babendreier.
INVENTORS:
Henry B. Manko
John W. Paine
BY Chas B. Mann
ATTORNEY.

UNITED STATES PATENT OFFICE.

HENRY B. MANKO AND JOHN W. PAINE, OF BALTIMORE, MARYLAND.

CASH REGISTER AND INDICATOR.

SPECIFICATION forming part of Letters Patent No. 450,416, dated April 14, 1891.

Application filed July 9, 1890. Serial No. 358,138. (No model.)

*To all whom it may concern:*

Be it known that we, HENRY B. MANKO and JOHN W. PAINE, citizens of the United States, residing at Baltimore, in the State of Maryland, have invented certain new and useful Improvements in Cash-Registers, of which the following is a specification.

This invention relates to improvements in that class of machines known as "cash-registers."

The improved machine is so arranged that it will indicate any amount either in dollars or cents, or both, and at the same time register the amount and add the amount last registered to that previously registered, and thus always show a total amount.

The invention is illustrated in the accompanying drawings, in which—

Figure 1 is a front view of the machine. Fig. 2 is a rear view of the same. Fig. 3 is a central cross-section of the machine. Fig. 4 is a view showing the registering mechanism. Fig. 5 is a top view of the registering mechanism. Fig. 6 is a side view of the ratchet-wheel, showing the cam-groove therein. Fig. 7 is a cross-section of the frame, taken through the ratchet-wheels. Fig. 8 is a side view of the push mechanism. Figs. 9 and 10 show views of that part of the registering mechanism which registers the totals above one hundred dollars. Fig. 11 is an edge view of the ratchet-wheel that is worked by the push-lever, and Fig. 12 is a collective view of several of the parts of the dollar-registering mechanism.

The machine comprises the outer cabinet or inclosing case A (see Figs. 1, 2, and 3) and an inner metal frame having a front and rear wall H H'.

The letters B B' designate the manipulating-hands for indicating the amount of each sale. These are at the front side. C C' are the indicator-hands at the rear side, which display the amount of the sale to the customer; D, the finger-push lever, which allows the cash-receptacle E to open and also allows the indicating-hands to return to their normal position.

A dial F (see Fig. 1) is on the front and at the left side of the case and is graduated from 1 to 100. This is the cent-indicating dial. A similar dial F' on the right side of the machine in the same figure is the dollar-indicating dial. Both of said dials will be referred to as indicating-dials, as they indicate the amount of a sale. From the center of the above indicating-dials and in front of them turn the two manipulating-hands B B'.

At the rear of the machine (see Fig. 2) are two indicating-dials G G', corresponding to the two indicating-dials F F' on the front of the case. In the front of said indicating-dials G G' are the indicating-hands C C', which are seen by the customer through a glass plate A' in the rear of the cabinet. The normal position of the four indicating-hands is at zero, which is at the top of the respective dials. The manipulator-hands B B' turn from left to right, while the indicating-hands C C' turn from right to left. Each manipulator is mounted on one end of a shaft, (designated $b$ $b'$, respectively,) which has bearings in the walls of the inner frame. On the other end of each of said shafts $b$ $b'$ is fixed a pinion-wheel $a$ to intermesh with a similar wheel $c$ of corresponding size mounted on a shaft $c'$. These shafts $c'$ form the center of the rear indicating-dials G G', respectively. On the said shafts $c'$ are mounted the indicating-hands C C'. Two spiral springs I I' have one end attached to the front wall H of the frame. The other end of one of the springs I is attached to the shaft $b$, and the other end of the other spring I' is attached to the other shaft $b'$. The said springs I I' are so arranged that they tend to draw the manipulating-hands B B' respectively from right to left, which is the opposite direction to the movement the said manipulating-hands take when indicating a sale. Thus it will be seen that when a sale is being indicated one or both of the springs I I' will at the same time be drawn around the shafts $b$ $b'$, and thus contracted preparatory to bringing the hands B B' back into their normal vertical position, pointing to zero.

Mounted on the shafts $b$ $b'$, respectively, and turning therewith are arms $d$ $d'$, each of which is provided with a spring-pawl consisting of a pawl $e$ and a spring $e'$, attached to the arm. In their normal position these arms $d$ $d'$ rest against stops $d^2$. Mounted loosely on the shafts $b$ $b'$ are sleeves $f f'$, to one end of which is attached a ratchet-wheel $g$, which has on one side a cam-groove $h$. This ratchet-wheel may be made of two separate wheels soldered or otherwise secured together, as shown in Fig. 7, only one of which need be provided with teeth, which teeth are engaged by the said spring-pawl $e$ of the arm $d$. On the other end of this sleeve $f$, which is reduced a portion of its length, is mounted a registering-hand J, which turns in front of a registering-dial K, which is divided into one hundred spaces. This is called the "cent registering and adding dial." It will now be seen that when a sale is indicated upon the cent-manipulating dial F it will also be indicated on the cent-dial G and registering-dial K; but on this latter cent-registering dial K the sale will remain registered even after the manipulating-hand B has been allowed to regain its normal position, this feature being due to the pawl $e$ engaging with the teeth of the ratchet-wheel $g$ and rotating the wheel when moving forward, but slipping over them and letting the wheel remain stationary when it is moving in the opposite direction or returning to the starting-point. Mounted on the sleeve $f$ between the said ratchet-wheel $g$ and registering-hand J is a second ratchet-wheel L. Also mounted on the shaft $b$ is a ratchet-wheel $i$, which will be hereinafter referred to.

On the dollar-indicating shaft $b'$ is mounted the manipulating-hand B', the arm $d'$ with its spring-pawl $e$, the pinion-wheel $a$, a ratchet-wheel $i'$, the spring I', and sleeve $f'$. These parts are all similar to those mounted on the shaft $b$. The shaft $b'$ is geared with the indicating-hand C' in a similar manner to the gearing of the shaft $b$ by means of the pinion-wheels $a$ and $c$ and shaft $c'$. The sleeve $f'$ on the shaft $b'$ has on one end a ratchet-wheel $g'$, which engages the spring-pawl $e$ of the arm $d'$. This ratchet-wheel $g'$ is similar to the other ratchet-wheel $g$ with the exception that it has no cam-groove. Mounted on the other end of the sleeve $f'$ is a registering-hand J', which registers and adds on the dollar-registering dial K'. This construction is also similar to that of the cent-registering mechanism. Mounted on the sleeve $f'$ and back of the dial K' is a sector-wheel $j^2$, which has one tooth $j$, Fig. 10, which intermeshes at every revolution with one of ten teeth of a pinion-wheel $k$, which is mounted on a shaft $l$. One end of this shaft extends through the registering-dial K' and is provided with a hand $m$, which registers on a small dial $n$, Fig. 9, formed on the registering-dial K'. This dial $n$ is graduated from 1 to 10. Each one of the graduated spaces on the dial $n$ indicates a hundred dollars. Mounted on the shaft $l$ and rigidly connected with the pinion-wheel $k$, is also a sector-wheel having one tooth $j'$, which at every revolution engages with one of ten teeth of a pinion-wheel $k'$, mounted on a shaft $l'$, which extends through the dial K'. This shaft $l'$ has a hand $m'$, which registers on a small dial $n'$, formed on the registering-dial K'. This dial $n'$ is graduated from 1 to 10 and each graduated space on the dial indicates one thousand dollars. On the sleeve $f'$ of the shaft $b'$ and near the ratchet-wheel $g'$ are fixed two ratchet-wheels L' L$^2$, the teeth of one being in opposite direction to those of the other.

The cam-groove $h$ is occupied by a friction-roller $h'$, which is mounted on one end of a lever M, Figs. 4 and 5, pivoted at $p$. On the other end of this lever is a pawl $q$ and spring $q'$. This pawl engages with the teeth of the ratchet-wheel L$^2$. A raise $h^2$ in the cam-groove $h$ is so made that for every revolution of the ratchet-wheel $g$ and cam-groove $h$ the said pawl $q$ will move the ratchet-wheel L$^2$ one tooth forward, and as the said ratchet-wheel L$^2$ and registering-hand J' are fixed on the same sleeve $f'$ the registering-hand will at every revolution of the ratchet-wheel $g$ also advance one space, and thereby indicate a dollar. Pivoted to the lever M is an arm M', which extends up and toward the ratchet-wheel L$^2$, and a spring $r$ forces the arm toward the said ratchet-wheel and against a stop $r'$. The upper end of the arm M' has a seat to take under a shoulder $n^2$ on one arm N of a right-angled lever, whose other arm N' engages with the teeth of the ratchet-wheel L', the teeth of which are in a reverse direction to those of the ratchet-wheel L$^2$, which are engaged by the pawl $q$. A spring N$^2$ tends to keep the angle-lever arm N' disengaged from the ratchet-wheel L'. The upper end of the arm M' will take under the arm N of the angle-lever when the friction-roller $h'$ is in that part of the cam-groove $h$ which is farthest from the axis—to wit, the raise $h^2$. The said roller $h'$ will be in this part of the groove immediately before transferring from the cent-registering dial K to the dollar-registering dial K' by means of the said lever M. It will now be seen that when the ratchet-wheel $g$ is further revolved the sudden fall in the cam-groove $h$ will cause the roller $h'$ therein to move the lever M, whereby the lever-arm M' will raise the arm N of the angled lever. The arm N' of the said angled lever will at the same time be brought against the periphery of the ratchet-wheel L', thus allowing the pawl $q$ to move the ratchet-wheel one space, and thereby register only one dollar on the dollar-registering dial K'.

Fixed to the arm M' is an elongated boss O', which engages a projection or pin $u$ on one arm O of an oblique-angled lever, which is pivotally connected with an arm O$^3$ by means of a screw O$^4$, the arm being secured by a screw O$^5$ to a post O$^6$ from the plate H'. The other arm O$^2$ of this lever engages a pin $d^3$ on the pawl-arm $d'$, so that when a sale on the dollar-dial K' is to be registered and the arm $d'$ moved the said pin $d^3$ will depress the arm O$^2$ and disengage the angle-lever arm N' from the ratchet-wheel, for the reason that when depressing the arm O$^2$ the pin $u$ acts against the elongated boss O, and thereby releases the arm N of the angle-lever. Pivoted in the frame H H' is also a ratchet-wheel P, Fig. 3, which has twelve teeth and also twelve pins $v\ v'$. Six of these pins $v$ project from one face, and at the base of alternate teeth of the wheel the other six pins $v'$ project from the opposite face of the wheel and from the base of the respective teeth between the said alternate ones previously referred to. Engaging with the ratchet-teeth of said wheel P are two pawls P' P², one a pushing and the other a drawing pawl, the latter being a hook. These pawls are mounted on a push-lever D.

Pivoted to the rear wall H' of the inner frame are two levers Q Q', one of which Q engages with the pins $v$ of the ratchet-wheel P and is successively raised by them in their revolution about the axis of said ratchet-wheel, and the other lever Q' engages with the pins $v'$ upon the wheel P and is depressed by them. Connected with the free end of this lever Q is a bolt R, which engages with a segment S and locks the lid E' of the cash-receptacle. This lid is mounted loosely on a shaft $w$, and a spring $w'$ automatically raises the lid when the bolt is drawn. It will now be seen that when the lever D is pushed down one or the other of the pawls P' or P² will engage with its respective tooth of the wheel P and rotate the wheel the distance of one tooth; but as there is only one pin $v$ for every two teeth it will require two depressions of the lever D to turn the wheel P far enough to cause one of the pins $v$ to raise the bolt sufficiently to unlock the cash-drawer. As soon as the pin $v$ passes from under the shoulder Q² of the lever Q the lever falls and the bolt is ready to engage with the segment S and lock the lid of the cash-drawer whenever it is closed. Connected with the free end of the said lever Q' by a rod T are two right-angled levers T' T², which engage in their normal position with the teeth of the ratchet-wheels $i\ i'$ on the shafts $b\ b'$, respectively. These levers are kept in engagement with the teeth of said ratchet-wheels by spiral springs $x\ x'$, respectively. The free end of the lever Q' is preferably formed into or provided with a shoulder Q³, with which the pins $v'$ engage as the wheel P is rotated; but as there is only one pin $v'$ for every two teeth it requires two depressions of the lever D to operate the lever Q'. By this arrangement a cash amount once indicated will continue to be indicated until the push-lever D has been pressed down twice and the ratchet-wheel P moved until one of the pins $v'$ operates the lever Q'. The push-lever D also has a boss or projection U on either side, which engages the one arm V of two levers. The other arm V' of said levers engages with the teeth of the ratchet-wheels L L', respectively, mounted on the sleeves $f\ f'$. The said ratchet-wheels L L' turn in an opposite direction to the ratchet-wheels $i\ i'$.

It will be seen that when the push-lever D causes the levers T T' to release the ratchet-wheels $i\ i'$ the said arms V' will engage with the teeth of the respective ratchet-wheels L L'. The lever-arms V', previously referred to, are kept disengaged from the teeth of the ratchet-wheels L L' by a spring $y$. When the push-lever D is up, the one end of the spring is attached to the arm V' and the other end to the inner frame H H'.

A spring W, which has one end attached to the rear wall H' of the frame and the other end to the free portion of the lever D, keeps the said lever raised and ready for action.

Having described the several parts of the invention, the operation is as follows: In indicating and registering a sale, say, of fifty cents, the left manipulating-hand B is turned until it comes to the 50¢-mark on the indicating-dial F. At the same time the indicating-hand C, by means of the connections described, will indicate the sale on the dial G; also in the same operation the registering-hand J will register the sale of 50¢ on the dial K. After indicating and registering the sale the operator will press the finger-push D to open the cash-receptacle E for depositing the money therein. The two hands B and C remain in the above position until it is desired to indicate and register the amount of another sale. When this is desired, the finger-push D will be depressed, and thus allow the hands B and C to resume their normal position. Suppose the second sale to be seventy-five cents, the manipulating-hand will be moved to indicate 75¢, while the registering-hand J will move seventy-five spaces farther on the registering-dial K, it having remained at 50¢, which registered the fraction of a dollar of the total sales. The total of the two sales is one dollar and twenty-five cents. Now, as this is twenty-five cents more than one dollar, the lever M will have been moved when the total became one dollar, thereby moving the dollar-registering hand J' one space to indicate the amount of one dollar on the registering-dial K' and the balance of 25¢ will remain registered on the dial K.

Having described our invention, we claim—

1. In a cash register and indicator, the combination of a cent-manipulating hand, a dollar-manipulating hand, two dials upon which said hands indicate, respectively, all of which are at the front of the machine, two hands, one for adding and registering cents and the other for dollars, at the rear side of the machine, co operating with said manipulating-hands on the front side, two graduated dials upon which the said registering-hands register, a lever M, one arm of which is depressed at every complete revolution of the cent-registering hand and having its other arm suitably connected with the dollar-registering hand, so that for every one hundred cents registered on the cent-registering dial the dollar-registering hand will be caused to move one space on the dollar-registering dial, and a hundred-dollar-registering hand and dial graduated into ten spaces, each of which indicates one hundred dollars, the hundred-dollar hand being connected with the dollar-registering hand, so that for every amount of one hundred dollars registered on the dollar-registering dial the hundred-dollar-registering hand will be caused to move one space.

2. In a cash register and indicator, the combination of a cent-manipulating hand, a dollar-manipulating hand, two dials upon which said manipulating-hands indicate, respectively, all of which are at the front of the machine, springs to act upon the said manipulating-hands to keep them against stops when pointing to zero and to bring them back to said stops after indicating a sale, two indicating-hands, a cent and a dollar hand, respectively, at the rear of the machine, these hands co-operating with said manipulating-hands, respectively, two dials, respectively, upon which the said hands indicate, also at the rear of the machine, two registering-hands, one to register the amount of cents and the other the amount of dollars, co-operating, respectively, with the two manipulating-hands on the front of the machine, two graduated dials, upon which said registering-hands register, also at the rear of the machine, a lever M, one arm of which is depressed at every complete revolution of the cent-registering hand and having its other arm suitably connected with the dollar-registering hand, so that for every one hundred cents registered on the cent-registering dial the dollar-registering hand will be caused to move one space on the dollar-registering dial, a lever D, in connection with the manipulating-hands and with a lock-bolt of a cash-receptacle E, so that at one downward push of the lever the cash-receptacle bolt will be drawn and that at a second push the lever will release the cent and dollar manipulating hands and thereby allow them to regain their normal position.

3. In a cash register and indicator, the combination of a manipulating-hand B, a graduated dial F back of said manipulating-hand, a shaft $b$, on which said manipulating-hand is mounted, an indicating-hand to coact with said manipulating-hand, a graduated dial, over whose face the said indicating-hand travels, a finger-push lever D, which coacts with the manipulating-hand so as to retain it when the lever is operated once and release it when the lever is operated more than once, a cash-receptacle, and a bolt to coact with said finger-push, whereby to open the receptacle, as and for the purpose set forth.

4. In a cash register and indicator, the combination of a manipulating-hand B, a graduated dial F back of said manipulating-hand, a shaft $b$, on which the manipulating-hand is mounted, an arm $d$, having a spring-pawl $e$, also mounted on the said shaft $b$, an indicating-hand geared with said shaft $b$, but turning in an opposite direction to it, a sleeve or collar $f$, mounted on said shaft $b$, a ratchet-wheel $g$ and a registering-hand J, both mounted on said sleeve $f$, the said ratchet-wheel engaged by the said spring-pawl $e$, and a graduated registering-dial K, in front of whose face turns the said registering-hand J, as set forth.

5. In a cash register and indicator, the combination of a manipulating-hand B, a graduated dial F back of said manipulating-hand B, a shaft $b$, on which the said manipulating-hand is mounted, an arm $d$, mounted on the said shaft $b$ and having a spring-pawl $e$, an indicating-hand C to coact with the manipulating-hand, but to move in an opposite direction, a graduated dial, in front of whose face the said indicating-hand turns, a sleeve $f$, mounted loosely on the shaft $b$, a ratchet-wheel $g$ and registering-hand J, both mounted on the sleeve, said ratchet to engage the said spring-pawl $e$, a finger-push lever D, having two pawls, one a push-pawl and the other a hook, a ratchet-wheel to engage with the said pawls, pins extending from either side of said ratchet-wheel, a pin on one side of said wheel being placed opposite the central point between two adjoining or successive pins on the opposite side, two levers to engage with said pins, one of said levers also connecting with and operating a cash-receptacle bolt and the other operating a pawl-lever, and a ratchet-wheel $i$ to engage said pawl-lever.

6. In a cash register and indicator, the combination of two manipulating-hands B B', one for indicating cents and the other for dollars, two graduated dials F F' back of said manipulating-hands, respectively, shafts $b b'$, on which said manipulating-hands are mounted, arms $d\ d'$, mounted on the shafts $b\ b'$, each having a spring-pawl $e$, sleeves $f f'$, mounted loosely on the shafts $b\ b'$, ratchet-wheels $g\ g'$, one of which $g$ is provided on its side with a cam-groove $h$, and registering-hands J J', all mounted on said sleeves $f f'$, respectively, two registering-dials K K', one for registering cents and the other for dollars, upon which the said registering-hands J J' register, a ratchet-wheel $L^2$ on the shaft $b'$, and a lever M, on one arm of which is mounted a friction-roller $h'$, that has position in the said cam-groove of the ratchet-wheel and the other arm to engage with the teeth of the ratchet-wheel $L^2$, as set forth.

7. In a cash register and indicator, the combination of two manipulating-hands B B', one for indicating cents and the other for dollars, two graduated dials F F' back of said manipulating-hands, respectively, shafts $b b'$, on which said manipulating-hands are mounted, arms $d\ d'$, mounted on the shafts $b\ b'$, each having a spring-pawl $e$, sleeves $f f'$, mounted loosely on the shafts $b\ b'$, ratchet-wheels $g\ g'$, one of which $g$ is provided on its side with a cam-groove $h$, and registering-hands J J', all mounted on said sleeves $f\ f'$, respectively, two registering-dials K K', one for registering cents and the other for dollars, upon which the said registering-hands J J' register, a ratchet-wheel $L^2$ on the shaft $b'$, a lever M, on one arm of which is mounted a friction-roller $h'$, that has position in the cam-groove of the ratchet-wheel and the other arm to engage with the teeth of the ratchet-wheel $L^2$, an arm $M'$, projecting from said lever $M$, a right-angled lever, one arm $N$ of which rests on the upper end of the arm $M'$, and the other arm $N'$ engaging with the teeth of a ratchet-wheel $L'$ on the sleeve $f'$, so that the lever $M$ can move the said ratchet and dollar-registering hand only one space, and thus indicate only one dollar.

In testimony whereof we affix our signatures in the presence of two witnesses.

HENRY B. MANKO.
JOHN W. PAINE.

Witnesses:
PHILIP A. BOSS,
FRANK W. CASSARD.